United States Patent
Janhunen

(10) Patent No.: US 7,443,499 B2
(45) Date of Patent: Oct. 28, 2008

(54) METHOD FOR MEASURING THE SAGGING OF A GLASS PANEL

(75) Inventor: Toivo Janhunen, Lahti (FI)

(73) Assignee: Glaston Services Ltd. Oy, Tampere (FI)

( * ) Notice: Subject to any disclaimer, the term of this patent is extended or adjusted under 35 U.S.C. 154(b) by 76 days.

(21) Appl. No.: 11/632,415

(22) PCT Filed: Jun. 30, 2005

(86) PCT No.: PCT/FI2005/050261

§ 371 (c)(1), (2), (4) Date: Mar. 29, 2007

(87) PCT Pub. No.: WO2006/005805

PCT Pub. Date: Jan. 19, 2006

(65) Prior Publication Data

US 2008/0068620 A1    Mar. 20, 2008

(30) Foreign Application Priority Data

Jul. 14, 2004   (FI) .................................. 20045273

(51) Int. Cl.
*G01N 21/00* (2006.01)
(52) U.S. Cl. ................. 356/239.1; 356/239.7

(58) Field of Classification Search ........................ None
See application file for complete search history.

(56) References Cited

U.S. PATENT DOCUMENTS

2007/0017253 A1 *   1/2007   Janhunen .................. 65/29.12

\* cited by examiner

*Primary Examiner*—Michael P Stafira
(74) *Attorney, Agent, or Firm*—Buchanan Ingersoll & Rooney PC

(57) ABSTRACT

A method for measuring the sagging of a glass panel in the process of bending the glass panel on a ring mould. The method includes measuring the sagging at a glass panel's measuring point and the measurement data is applied to control progress of the bending process, especially heating of the glass panel or abortion of the bending process. A reference plane stationary with respect to the ring mould is established, a distance gauge is used for measuring a distance between the reference plane and the distance gauge, and a distance gauge is used for measuring a distance between the glass panel's measuring point and the distance gauge. The glass panel's sagging is determined by comparing the distance between the reference plane and the distance gauge to the distance between the glass panel's measuring point and the distance gauge.

6 Claims, 2 Drawing Sheets

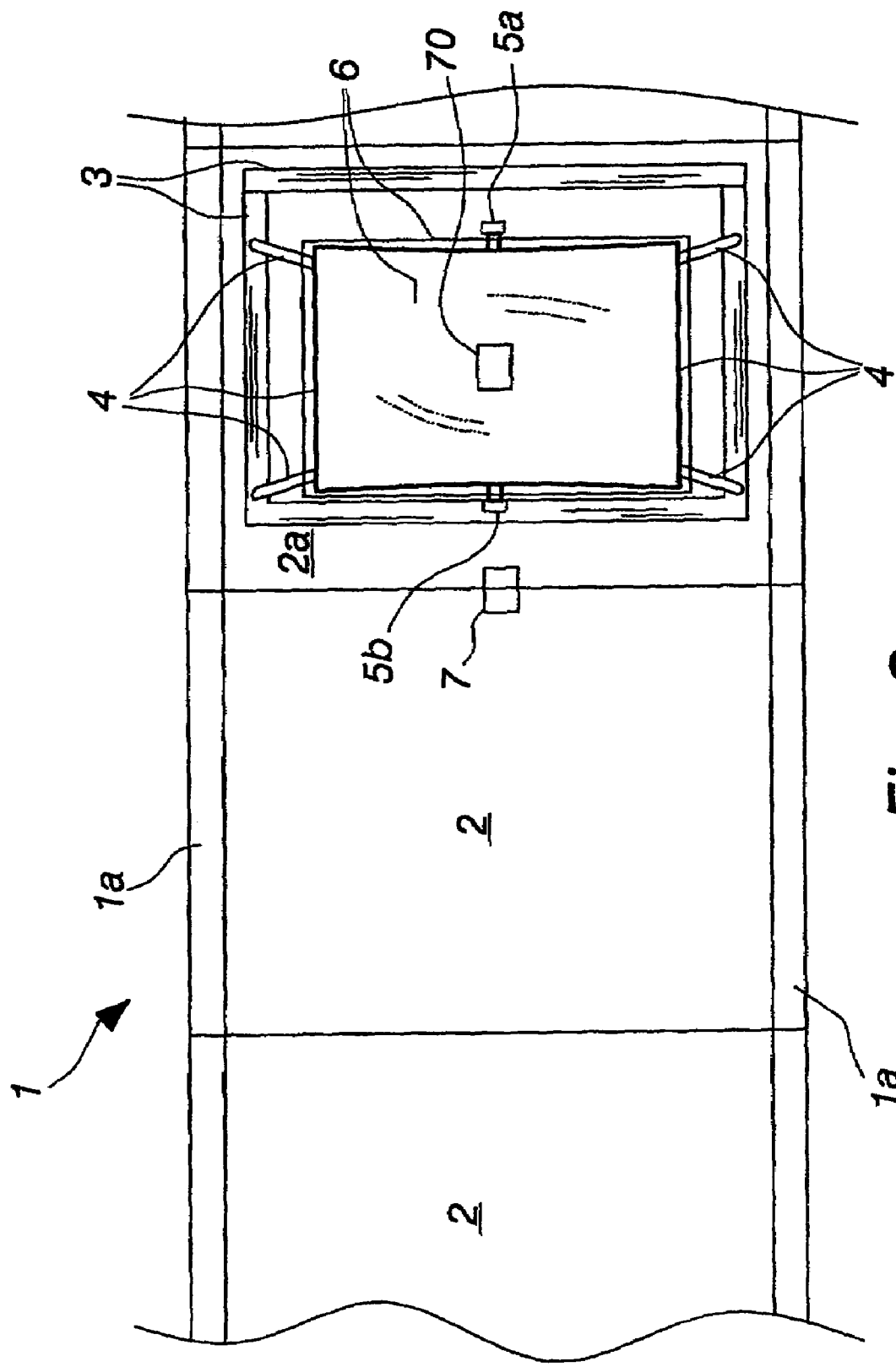

METHOD FOR MEASURING THE SAGGING OF A GLASS PANEL

TECHNICAL FIELD

The present invention relates to a method for measuring the sagging of a glass panel in the process of bending the glass panel on a ring mould, said method comprising establishing a reference plane stationary or positionally fixed with respect to the ring mould and measuring the sagging at a glass panel's measuring point and the measurement data being applied to control progress of the bending process, especially heating of the glass panel or abortion of the bending process.

BACKGROUND OF THE INVENTION

This type of method for measuring a glass panel's sagging is prior known from Finnish patent application FI-912871. That comprises monitoring the sagging with a measuring instrument for applying a laser beam to the surface of a glass panel and a CCD camera is used for tracking the distance of a confluence point between glass and laser beam from a reference plane. This arrangement requires a lot of space and sets constraints regarding the choice of a measuring point. An angle of reflection required for the laser beam calls for two holes in the roof of an oven for each measuring point and accuracy is not sufficient because of the angle of reflection.

Patent application WO 02/23124 discloses a method, in which a line camera is used for tracking the angle of reflection of a light beam reflected from glass. The angle of reflection is highly sensitive to a possible surface defect in glass and to a local curvature defect in glass, whereby the angle of reflection provides a defective measuring result. This method may also involve measuring the distance of a reflection point from the camera by applying a second light source and the triangulation principle.

In addition to the above, there are a host of prior known methods, disclosed for example in publications FI 850120 and FI 98757, wherein light beams reflected from an arched or arching glass panel are monitored in various ways by means of a line or matrix camera or cameras. These methods are hampered by problems similar to those found in the method disclosed in publication WO 02/23124.

It is an object of the present invention to eliminate or substantially alleviate the above drawbacks.

SUMMARY AND OBJECTS

In order to achieve the above object, a method of the present invention is characterized in that a distance gauge, including a transmitter and a receiver for laser pulses, is used for measuring a distance between the reference plane and the distance gauge by determining the transmission time of a laser pulse from transmitter to receiver, a distance gauge is used for measuring a distance between the glass panels measuring point and the distance gauge by determing the transmission time of the laser pulse from transmitter to receiver, and the glass panel's sagging is determined by comparing the distance between the reference plane and the distance gauge to the distance between the glass panel's measuring point and the distance gauge.

Preferred embodiments of the present invention are set forth in the dependent claims.

BRIEF DESCRIPTION OF THE DRAWINGS

The invention will now be described in more detail with reference to the accompanying drawings, in which:

FIG. 2 shows schematically an apparatus of the invention in a plan view.

DETAILED DESCRIPTION OF THE PREFERRED EMBODIMENT

Figure 1:
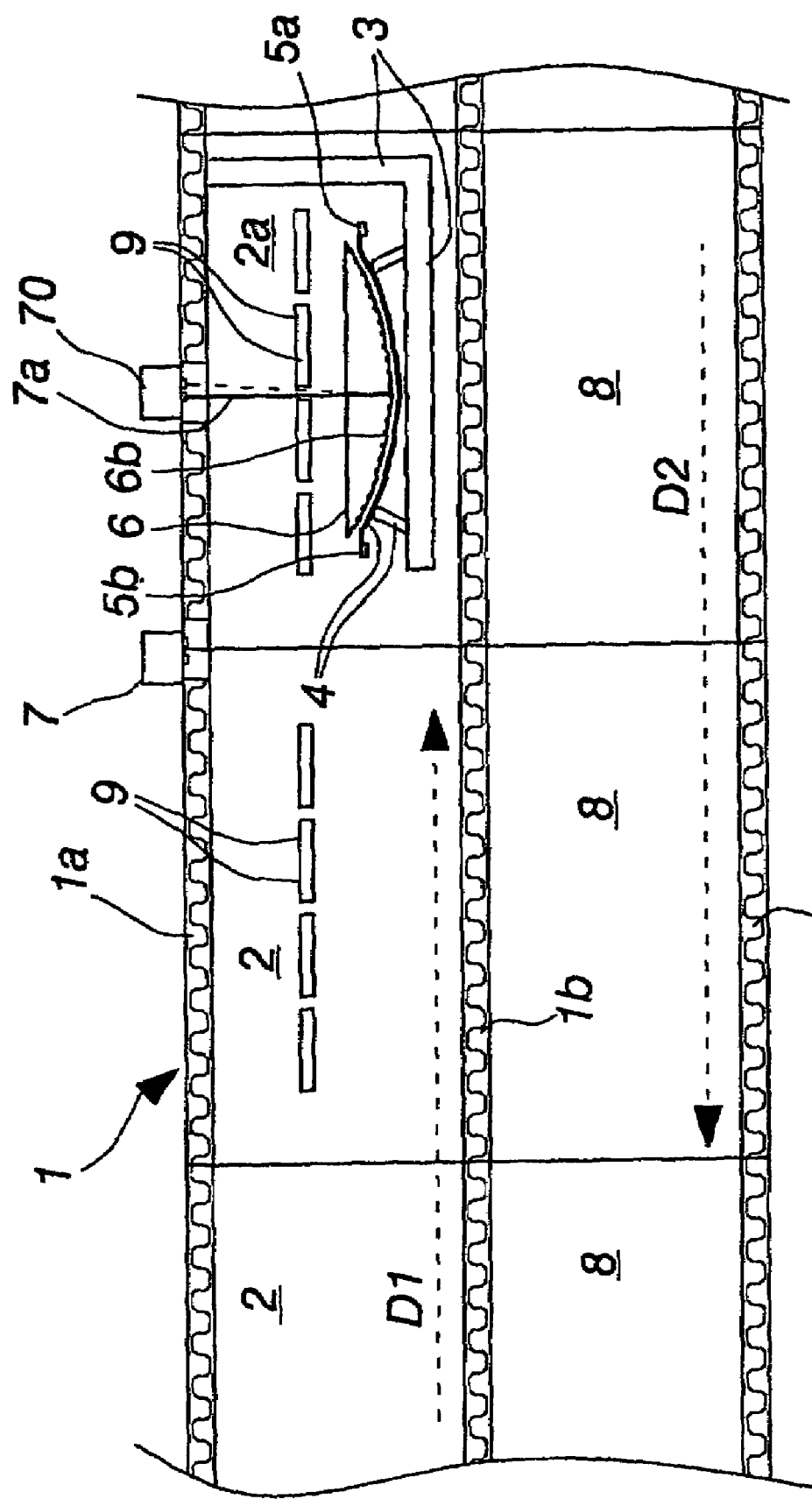
FIG. 1 shows schematically an apparatus of the invention in a side view.

Thus, FIGS. 1 and 2 depict one embodiment for an apparatus applying a method of the invention. There is shown a section of an oven 1 designed for bending a glass panel 6. The oven 1 includes an elongated space defined by walls 1a, which is divided by means of a floor 1b or the like for two elongated spaces on top of each other. The upper of these spaces is divided by the vertical walls of mould carriages 3 for successive preheating compartments 2, followed by an actual bending compartment 2a for the glass panel 6, in which the inventive method for measuring the glass panel's 6 sagging is actually applied. The glass panel is generally heated by means of resistances 9 disposed in the heating compartments 2 and in the actual bending compartment 2a. The section of an oven downstream of the bending compartment includes usually a lift compartment (not shown), whereby the bent glass panel 6 is conveyed into the lower space. The lower space is divided by the vertical walls of mould carriages 3 for successive cooling compartments 8 for performing a controlled cooling of the glass panel.

The glass panel 6 is carried on the mould carriage 3 along a conveying track provided in the oven 1 in a per se known manner from one compartment to the next. The glass panel 6 is laid on a ring mould 4 attached to the mould carriage 3. The advancing direction of an upper conveying track is indicated by reference numeral D1 and the traveling direction of a lower conveying track is indicated by reference numeral D2. The method comprises preheating the glass 6 on top of the ring mould 4 in the compartments 2. In the process of bending on the ring mould 4, the glass 6 is not supported at all in its middle section, but only along its periphery. As the mould carriage 3, and thereby also the glass panel 6, proceeds from the preheating compartment 2 to the bending compartment, the glass panel 6 may already be in a somewhat bent condition in its middle section. The actual bending, i.e. providing the glass panel 6 with a desired sagging, is performed in the bending compartment 2a.

In view of measuring the above sagging, between the preheating compartment 2 and the bending compartment 2a, outside the compartments 2 and 2a, preferably on top of the oven 1, is disposed a first distance gauge or sensor 7, which defines a first measuring point for the glass panel 6 in the proceeding direction of the track D1. In addition to this, on top of the bending compartment 2a, preferably above the glass panel's 6 middle section (with the glass panel immobilised in the bending compartment 2a), is disposed a second distance gauge or sensor 70, which is preferably identical in its design and function to the distance gauge 7 placed between the compartments. The second distance gauge 70 defines a second measuring point. This gauge 7 and 70, used for applying the method, comprises a transmitter and a receiver. The transmitter applies to the glass panel's 6 middle section, the surface thereof, at desired intervals, a short laser pulse 7a which reflects from the glass panel's 6 surface to the receiver. The distance can be determined on the basis of the laser pulse's 7a proceeding time from transmitter to receiver. The gauges 7 and 70 measure this proceeding time. The measurement can be performed at each measuring point from a single hole in the oven's roof, the space demand being modest and the measuring point or a plurality of measuring points being easy to choose.

In order to obtain this measuring result, it is necessary to establish a reference plane in conjunction with the glass panel 6 for comparing therewith the result measured from the middle of the glass panel 6. Therefor, the ring mould 4 or the mould carriage 3, preferably along the ring mould's 4 centre axis of symmetry, is provided with markers 5a and 5b or identification tags. Viewed in the proceeding direction D1, the markers are positioned in the carriage's leading and trailing sections in such a way that the glass panel 6 is held therebetween in its advancing direction.

A first measurement is performed while conveying the carriage 3 from the preheating compartment 2 to the bending compartment 2a. The first measurement involves using the distance gauge 7 for measuring a distance between the reference plane 5a and the distance gauge 7. Thus, it is preferred that the marker 5a be provided with a reflective surface for a laser pulse to reflect back to the distance gauge 7. A first fixed reference plane is thereby established for a second measurement. Next, the second measurement involves using the distance gauge 7 for measuring a distance between the glass panel's 6 measuring point and the distance gauge 7. The glass panel's 6 sagging is determined by comparing at least these two measuring results to each other. The glass panel 6 may have its surface 6b provided in the glass panel's 6 advancing direction even with a plurality of successive measuring points or the measurement may proceed almost continuously for providing a sagging profile in almost solid line.

As the mould carriage 3 proceeds further along its track D1, the trailing marker 5b will also pass by the discussed measuring point for providing a second reference plane. Thus, the mould-specific reference data can be readily obtained from two locations (a measurement of two reference planes enables a more precise determination of the reference plane than a measurement of just one reference plane), and also obtained is information about possible sagging caused by preheating. This information can be utilized, for example, in the process of determining or regulating beforehand an on/off pattern or effects produced by the bending compartment's 2a resistances 9 in preparation of bending the discussed glass panel 6. The measurement data can also be used in the process of regulating the preheating compartments' 2 heating effect for subsequent glass panels.

The actual sagging measurement, in other words a measurement for a distance and variation of distance to the immobilised glass panel's 6 centre (measuring point), is performed with the second distance gauge 70 during the bending process as shown in FIG. 1. In order to ensure a correct measuring result, the second gauge 70 also needs a reference plane, which it acquires by measuring a distance to the marker 5a carried along with the mould 4 proceeding into the bending compartment 2a. The measuring result obtained from the measuring point is compared to the reference plane measured by the second gauge 70. In addition to or instead of this, it is possible to effect a comparison with the reference planes measured by the first gauge 7. With regard to the marker 5b, the only available measuring result is the one provided by the first gauge 7. It is further possible to perform a measurement of sagging and a process control during the bending process without the first measurement effected by the first gauge 7. By tracking the measuring result or results, the heating process (resistances) can be controlled for producing a desired sagging. Once a desired sagging is achieved, the bending process can be stopped and the glass panel 6 carried along on its track D1 for further processing.

The number of gauges 7, 70 can be one, two or more. A practical implementation of the invention requires at least a gauge 70 present in the bending compartment. The number of reference planes 5a, 5b can also be one, two or more for each bending mould. Each reference plane 5a, 5b must be immobile or positionally fixed relative to the mould 4.

The invention claimed is:

1. A method for measuring the sagging of a glass panel in the process of bending the glass panel on a ring mould, said method comprising:
    establishing a reference plane stationary or positionally fixed with respect to the ring mould;
    measuring the sagging at a glass panel's measuring point; and
    applying the measurement data to control progress of the bending process;
    wherein measuring the sapping at the glass panel's measuring point includes: using a distance gauge, including a transmitter and a receiver for laser pulses, for measuring a distance between the reference plane and the distance gauge by determining the transmission time of a laser pulse from transmitter to receiver, using a distance gauge for measuring a distance between the glass panels measuring point and the distance gauge by determining the transmission time of the laser pulse from transmitter to receiver, and determining the glass panel's sagging by comparing the distance between the reference plane and the distance gauge to the distance between the glass panel's measuring point and the distance gauge.

2. A method as set forth in claim 1, wherein the distance gauge for measuring a distance between the reference plane and the distance guage defines a first distance gauge used for measuring the sagging of a pre-bent glass panel prior to a final bending process and the distance gauge for measuring a distance between the glass panels measuring point and the distance gauge defines a second distance gauge used for measuring the sagging of the glass panel during a final bending process.

3. A method as set forth in claim 1, wherein the glass panel's sagging is measured at several measuring points successive in the glass panel's advancing direction.

4. A method as set forth in claim 1, wherein the glass panel lies between two reference planes in the glass panel's advancing direction.

5. A method as set forth in claim 1, wherein the reference plane and/or the glass panel's measuring point are located essentially on the ring mould's centre axis of symmetry.

6. A method as set forth in claim 1, wherein applying the measurement data to control progress of the bending process includes applying the measurement data to control heating of the glass panel or abortion of the bending process.

* * * * *